(12) United States Patent
Ito et al.

(10) Patent No.: US 7,658,533 B2
(45) Date of Patent: Feb. 9, 2010

(54) LINE ILLUMINATION DEVICE AND IMAGE INPUT APPARATUS USING THE SAME

(75) Inventors: Atsushi Ito, Tokyo (JP); Hironobu Arimoto, Tokyo (JP); Toru Aramaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 115 days.

(21) Appl. No.: 11/856,336

(22) Filed: Sep. 17, 2007

(65) Prior Publication Data

US 2008/0239747 A1    Oct. 2, 2008

(30) Foreign Application Priority Data

Mar. 28, 2007   (JP)   ............................. 2007-084049

(51) Int. Cl.
*F21V 7/04* (2006.01)
(52) U.S. Cl. .................. 362/633; 362/634; 361/749
(58) Field of Classification Search .......... 362/612, 362/613, 632–634; 361/749; 174/254; 349/149
See application file for complete search history.

(56) References Cited

U.S. PATENT DOCUMENTS 7,210,838 B2 * 5/2007 Sakurai ..................... 362/607
7,284,891 B2 * 10/2007 Saito et al. ................. 362/615

FOREIGN PATENT DOCUMENTS

| JP | 2001-209138 | 8/2001 |
|----|-------------|--------|
| JP | 2001-357429 | 12/2001 |
| JP | 2002-190909 | 7/2002 |
| JP | 2002-270022 | 9/2002 |
| JP | 2003-46726  | 2/2003 |
| JP | 2003-60854  | 2/2003 |
| JP | 2004-64146  | 2/2004 |
| JP | 2005-347214 | 12/2005 |
| JP | 2006-148956 | 6/2006 |

* cited by examiner

*Primary Examiner*—John A Ward
(74) *Attorney, Agent, or Firm*—Oblon, Spivak, McClelland, Maier & Neustadt, L.L.P.

(57) ABSTRACT

A line illumination device includes: a frame; a rod-shaped light-guiding member housed in the frame; a flexible substrate; and a light source that is provided on the flexible substrate and emits light to the light-guiding member. The flexible substrate is bent so that the light source is disposed at an end of the light-guiding member and that the flexible substrate is housed in the frame. Power is supplied to the light source through a wiring provided on the flexible substrate so that the light source emits light and the light-guiding member emits light in line-shape.

17 Claims, 5 Drawing Sheets

LINE ILLUMINATION DEVICE AND IMAGE INPUT APPARATUS USING THE SAME

CROSS-REFERENCE TO RELATED APPLICATION

This application claims priority from Japanese Patent Application No. 2007-084049, filed on Mar. 28, 2007, the entire subject matter of which is incorporated herein by reference.

BACKGROUND OF THE INVENTION

1. Field of the Invention

The present invention relates to a line illumination device wherein light from a light source enters a light-guiding member and exits in a line shape, and to an image input apparatus for discriminating a bill by use of the line illumination device.

2. Description of the Related Art

An image sensor has hitherto been used in equipment such as a facsimile, a scanner, or the like. A line illumination device is usually used for the image sensor.

JP-A-2001-357429 (FIG. 3) discloses a line illumination device of this type, in which an LED attached to a substrate is arranged on a side surface (an end) of a light-guiding member. JP-A-2003-60854 (FIG. 1) discloses a line illumination device in which a light-guiding member is housed by an upper cover and a lower cover, and a light source unit is attached to one end of the upper cover. JP-A-2004-64146 (FIG. 3) discloses a line illumination device, in which a light source module is attached to an end of a light-guiding member. Although JP-A-2003-60854 discloses the light-guiding member being housed by the covers, the following configuration is not disclosed. That is, not only a light-guiding member but also a light source (a light source unit or a light source module) and the like are housed in a cover or a frame. Specifically, a compact configuration in which a light-guiding member, a light source, and the like are housed in a frame is not disclosed.

SUMMARY OF THE INVENTION

The present invention has been made in view of the above circumstances and provides a line illumination device having a compact configuration in which a light source and a light-guiding member are housed in a frame. In addition, the present invention provides a configuration for feeding power to the light source is also simple.

The present invention also provides an image input device of so-called transmission type using the line transmission device.

According to an embodiment of the present invention, a line illumination device includes: a frame; a rod-shaped light-guiding member housed in the frame; a flexible substrate; and a light source that is provided on the flexible substrate and emits light to the light-guiding member. The flexible substrate is bent so that the light source is disposed at an end of the light-guiding member and that the flexible substrate is housed in the frame. Power is supplied to the light source through a wiring provided on the flexible substrate so that the light source emits light and the light-guiding member emits light in line-shape.

According to an embodiment of the present invention, a line illumination device includes: a rod-shaped light-guiding member; a light source that emits light to the light-guiding member; a frame that includes an opening section housing the light-guiding member therein; and a flexible substrate that includes a wiring connected to the light source and is provided with the light source. The flexible substrate is bent so that the light source is disposed at an end of the light-guiding member and that the flexible substrate is housed in the opening section.

According to an embodiment of the present invention, a line illumination device includes: a rod-shaped light-guiding member; first and second light sources; a frame that houses the light-guiding member; a flexible substrate that is provided with the first and second light sources and includes a wiring connected to the first and second light sources; and a connector that is attached to the frame and connected to the wiring. The flexible substrate is bent so that the first and second light sources are disposed at ends of the light-guiding member, respectively, and that the flexible substrate is housed in the frame.

According to an embodiment of the present invention, a line illumination device includes: a rod-shaped light-guiding member including a plane portion in a lengthwise direction thereof; a reflection layer that is formed on the plane portion of the light-guiding member and that reflects incident light; a light source that emits light to the light-guiding member; a frame including an opening section to house the light-guiding member so that the plane portion faces a bottom of the opening section; and a flexible substrate that is provided with the light source and includes a wiring connected to the light source. The flexible substrate is bent so that the light source is disposed at an end of the light-guiding member and that the flexible substrate is housed in the opening section.

The flexible substrate may include: an elongating portion elongating along the light-guiding member; and a folded portion that is bent from an end of the elongating portion and is provided with the light source.

The elongating portion may be disposed along a guide provided in the opening portion.

The flexible substrate may include: an elongating portion elongating along the light-guiding member; a plurality of folded portions that are provided at both ends of the elongating portion and at a center of the elongating portion, respectively. The first and second light sources may be provided on the folded portions at both ends of the elongating portion, respectively. The connector may be provided on the folded portion at the center of the elongating portion.

According to an embodiment of the present invention, a line illumination device includes: a frame including an opening section and a through hole; a rod-shaped light-guiding member housed in the frame; a flexible substrate; a light source that is provided on the flexible substrate and emits light to the light-guiding member; a transmission plate that covers an entrance of the opening section; a connector that is connected to the flexible substrate and is exposed to outside of the frame through the through hole. The flexible substrate is bent so that the light source is disposed at an end of the light-guiding member and that the flexible substrate is housed in the opening section. Power is fed from the connector to the light source through the flexible substrate so that the light source emits light and the light-guiding member emits light in line-shape to the outside.

According to an embodiment of the present invention, a line illumination device includes: a frame including an opening section and a through hole; a rod-shaped light-guiding member housed in the frame; a light source that is disposed at an end of the light-guiding member and emits light to the light-guiding member; a wiring that is connected to the light source and is bent to be housed in the frame; and a connector that is connected to the wiring and is exposed to outside of the frame through the thorough hole. Power is fed from the connector to the light source through the wiring so that the light source emits light and the light-guiding member emits light in line-shape to the outside.

The line illumination device may further include a transmission plate that covers an entrance of the opening potion.

The light-guiding member may include a plane portion formed by cutting a column along a lengthwise direction thereof.

The line illumination device may further include a reflection layer that is formed by printing white paint on the plane portion of the light-guiding member.

The reflection layer may be formed so that a center of the reflection layer is wider than an end portion of the reflection layer at which the light source is disposed.

According to an embodiment of the present invention, an image input apparatus includes: the above-described line illumination device; a lens that converges light from the line illumination device through an original; and a sensor that receives the light converged by the lens.

The original may be a bill.

According to the configuration as described above, the line illumination device can be have compact configuration where the light source and the light-guiding member are housed in the frame and the configuration of feeding power to the light source is also simple.

Further, according to the configuration as described above, the image input apparatus can have a simple configuration of transmission type by use of the line illumination device.

BRIEF DESCRIPTION OF THE DRAWINGS

Embodiments of the present invention will be described in detail based on the following figures, wherein.

DETAILED DESCRIPTION OF THE INVENTION

First Embodiment

Figure 1:
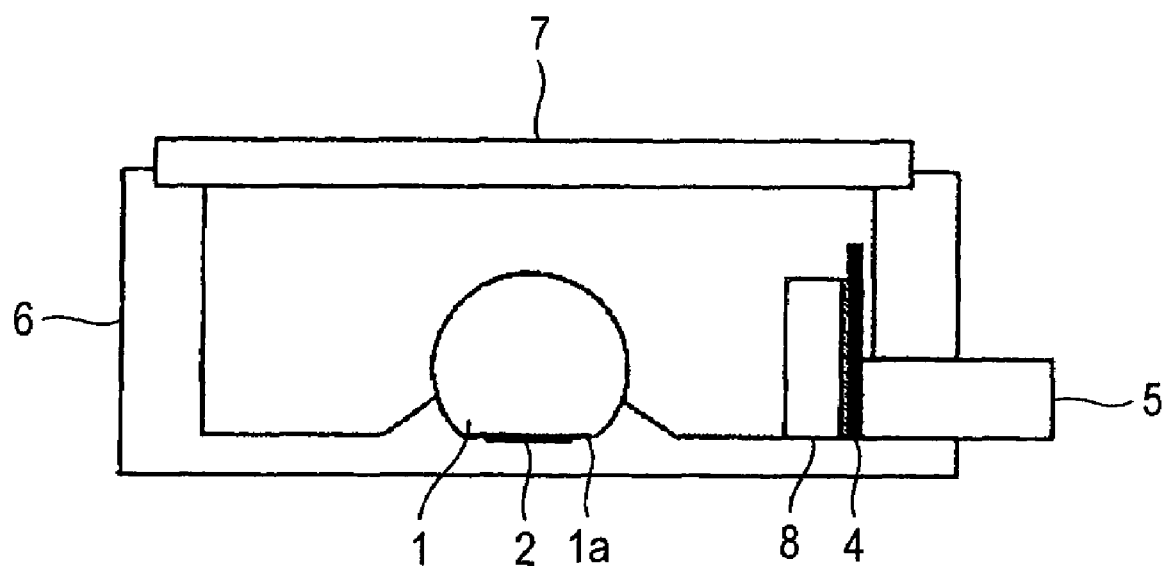
FIG. 1 is a cross-sectional structural view of a line illumination device according to a first embodiment of the present invention.
Figure 2:
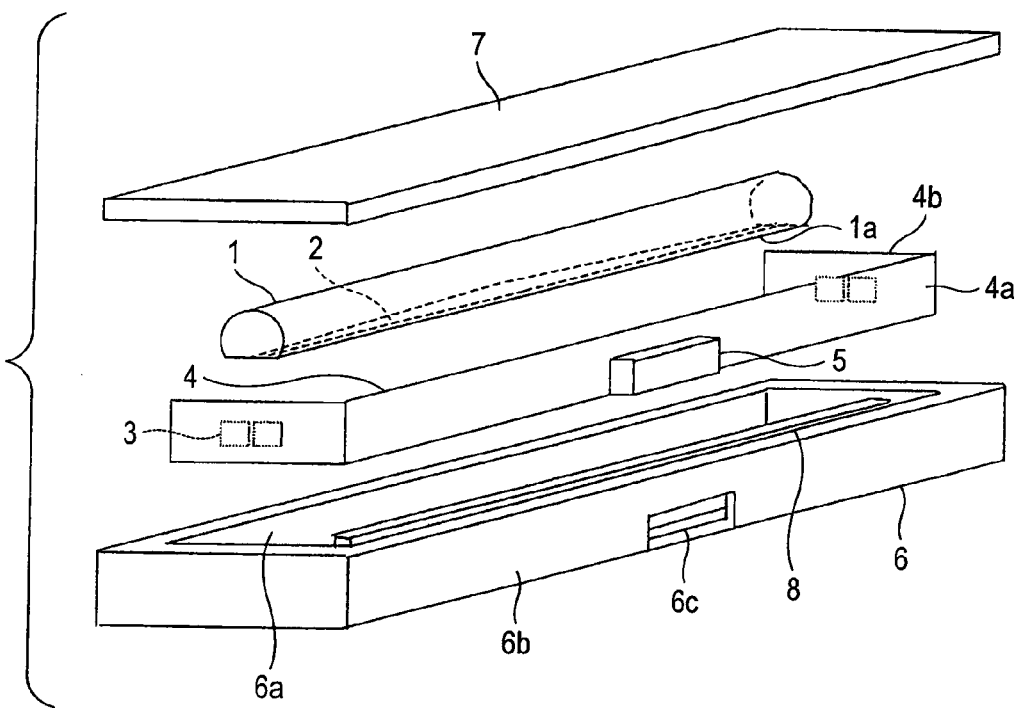
FIG. 2 is an exploded, perspective, structural view of the line illumination device according to the first embodiment.
Figure 5:
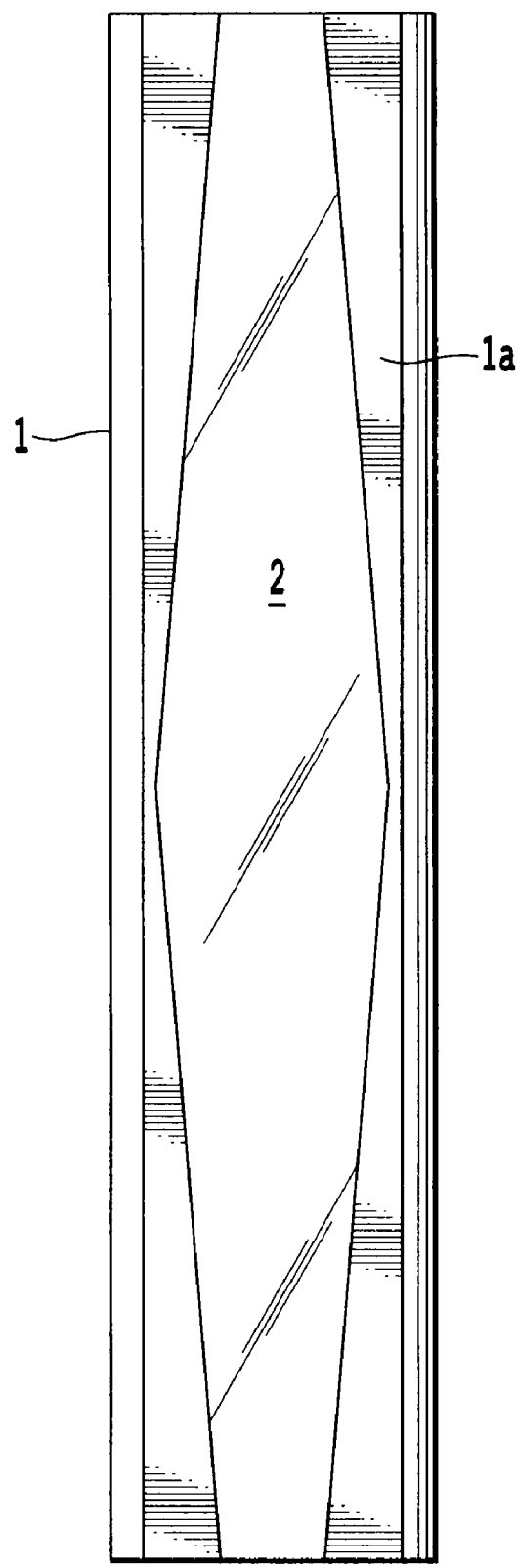
FIG. 5 is a view of the reflection layer the light guiding member shown in FIG. 2.

A first embodiment of the present invention will be described with reference to FIGS. 1 and 2. FIG. 1 is a cross-sectional structural view of a line illumination device according to the first embodiment. FIG. 2 is an exploded perspective view of the line illumination device shown in FIG. 1. In FIGS. 1 and 2, reference numeral 1 designates a light-guiding member, and a plane portion 1a is formed by cutting a columnar lower portion of the light-guiding member in a lengthwise direction. The light-guiding member may have rod shape. Reference numeral 2 designates a light reflection layer formed by printing a white coating material (white paint) on the plane portion 1a of the light-guiding member 1. The cross-sectional profile of the light-guiding member 1 is not limited to a semi-circular shape such as that shown in FIGS. 1 and 2 but may also assume a polygonal shape. In any event, the plane portion 1a where the reflection layer 2 is formed is disposed so as to serve as a lower surface. Reference numeral 3 designates a light source including, for example, a red (R) LED, a green (G) LED, and a blue (B) LED. In some cases, the light source may further include another infrared-radiation light source. The light source is disposed at either end of the light-guiding member 1 as shown in FIG. 2. However, the light source may also be disposed only at one end. When light sources 3 are disposed at both ends of the light-guiding member 1, the reflection layer 2 is formed so as to have a narrow width at a position in the vicinity of each end of the light-guiding member 1 and a wide width in the center of the light-guiding member 1, whereby the intensity of light originating from the light-guiding member 1 can be made uniform, as shown in FIG. 5.

In FIGS. 1 and 2, reference numeral 4 designates a flexible substrate including an elongating portion 4a and folded portions 4b formed by bending both ends of the elongating portion 4a. The light source 3 is attached to each of the folded portions 4b at both ends of the flexible substrate 4, so that the light sources 3 come to both ends of the light-guiding member 1. A connector 5 is attached to the elongating portion 4a. A wiring pattern (not shown) is printed on the flexible substrate 4, thereby electrically connecting the light sources 3 with the connector 5. The flexible substrate 4 is not limited to the above configuration. Any member including folded portion 4b used for placing the light sources 3 at both ends of the light-guiding member 1 and the elongating portion 4a extending along the light-guiding member 1 may serve as the flexible substrate 4.

As shown in FIG. 2, the flexible substrate 4 is arranged so as to sandwich the light-guiding member 1 from both sides thereof. Reference numeral 6 designates a frame, and an opening section 6a is formed in an upper surface of the frame. A through hole 6c is formed in a side surface 6b of the frame 6 so that the connector 5 is exposed to outside when the flexible substrate 4 is inserted into the opening section 6a of the frame 6. The light-guiding member 1 and the flexible substrate 4 are configured so as to be housed in the opening section 6a of the frame 6 along with the light sources 3. At this time, the connector 5 is fitted into the through hole 6c of the frame 6.

In FIG. 2, reference numeral 7 designates a transmission plate allowing passage of light. The transmission plate 7 comes into contact and is fixed to a surrounding upper end of the frame 6 by an adhesive, or the like, while the light-guiding member 1, the flexible substrate 4, and other members, are housed in the opening section 6a of the frame 6. Reference numeral 8 designates a guide provided inside of the opening section 6a. When the flexible substrate 4 is arranged as shown in FIG. 2, the elongating portion 4a of the flexible substrate 4 is guided along the guide 8.

In FIGS. 1 and 2, the opening section 6a is formed in the frame 6. However, the configuration is not limited to this. The frame may also be formed from an upper frame and a lower frame, to thus create a hollow inside. In addition, it may be better to form the upper frame as being transparent so as to allow transmission of light. In this case, the upper frame corresponds to the transmission plate 7 so that the transmission plate 7 is obviated.

Figure 3:
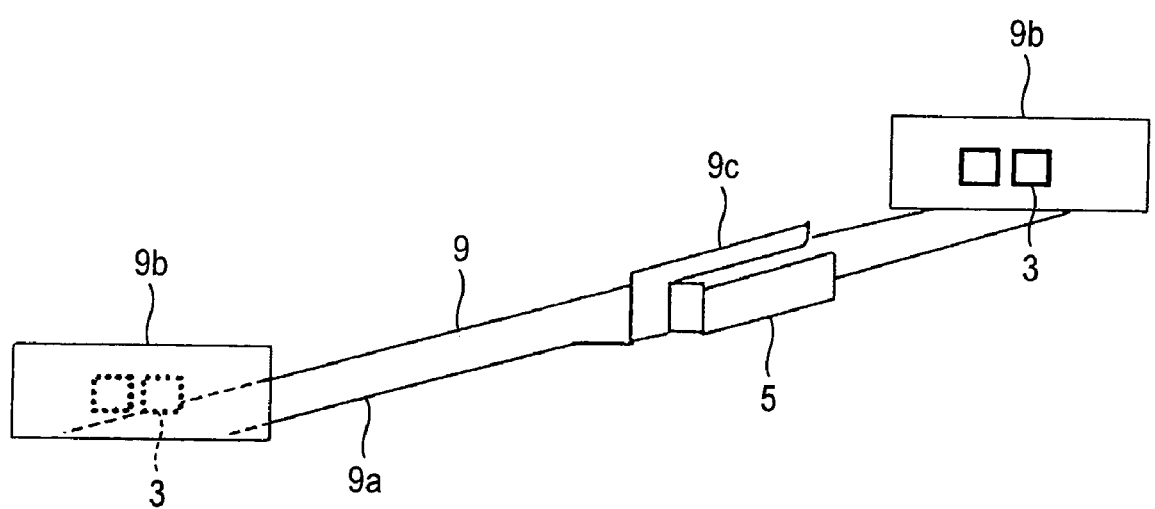
FIG. 3 is a perspective view showing another example of a principal section in the line illumination device according to the first embodiment.

FIG. 3 is a perspective view showing another example of the flexible substrate 4 in the line illumination device according to the first embodiment. In this case, reference numeral 9 designates a flexible substrate which has an elongating portion 9a, folded portions 9b, and another folded portion 9c. The light sources 3 are attached to the respective folded portions 9b in the same manner as mentioned above. The connector 5 is attached to the folded portion 9c. Since there is adopted a configuration of placing the elongating portion 9a on a lower side of the plane portion 1a of the light-guiding member 1 along the plane portion 1a, such a folded portion 9c is provided for a case where the connector 5 is taken out from the side of the frame 6. In other respects, the flexible substrate has similar configuration as that mentioned above.

According to the above-described configuration, the flexible substrates 4 and 9 are used. However, a connection cable may also be used in place of the flexible substrates 4 and 9. In this case, the light source 3 is attached to a substrate (not shown), and the substrate is attached to the frame 6 such that the light source 3 comes to an end of the light-guiding member 1. One end of the connection cable is connected to a terminal (not shown) of the substrate. The connection cable is housed in the opening section 6a of the frame 6. The other end of the connection cable is connected to the connector 5. The same also applies to a case where the light sources 3 are placed at both ends of the light-guiding member 1.

Second Embodiment

Figure 4:
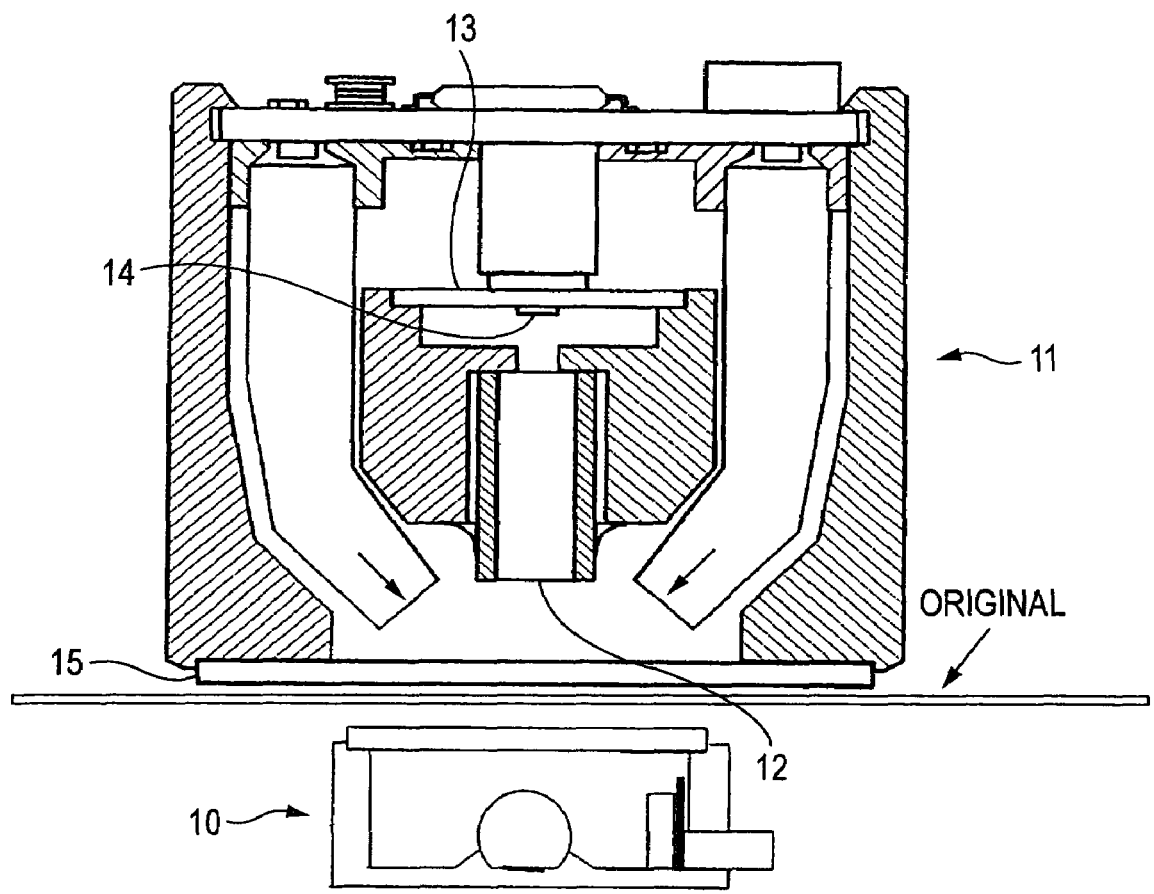
FIG. 4 is a cross-sectional structural view of an image input apparatus according to a second embodiment of the present invention.

An image input apparatus of a second embodiment according to the present invention will be described with reference to FIG. 4. FIG. 4 is a cross-sectional structural view of the image input apparatus according to the second embodiment. In FIG. 4, reference numeral 10 designates a light illumination device having the configuration described in connection with the first embodiment. Reference numeral 11 designates a light-receiving device. An original is transported to a position between the light-receiving device 1 and the line illumination device 10. The original may include a bill and the like. Light emitted from the line illumination device 10 passes through the original and is converted at a lens member 12 of the light-receiving device 11. The light converged by the lens member 12 is received by a sensor 14 arranged on a substrate 13 and subjected to photoelectric conversion. Reference numeral 15 designates a glass plate. As mentioned above, so long as the line illumination device according to the first embodiment is used as a light source of a transmission-type image sensor, compactness and uniform intensity of light are attained. Therefore, when the original is a bill, the original can be effectively read.

In the image input device according to the second embodiment, the height of the line illumination device 10 may be set to about 11 mm, and a gap between the light-receiving device 11 and the line illumination device; namely, a gap in a thickness direction of the original for transporting an original may be set to 1 mm, and the height of the image input apparatus may be set to about 18 mm.

What is claimed is:

1. A line illumination device comprising:
   a frame;
   a rod-shaped light-guiding member housed in the frame, the rod-shaped light-guiding member extending in a length direction a distance much greater than the rod-shaped light-guiding member extends in a thickness direction and a width direction;
   a flexible substrate; and
   a light source that is provided on the flexible substrate and emits light to the light- guiding member;
   wherein the flexible substrate is bent so that the light source is disposed at an end of the light-guiding member and that the flexible substrate is housed in the frame, and
   wherein power is supplied to the light source through a wiring provided on the flexible substrate so that the light source emits light and the light-guiding member emits light in line-shape.

2. The line illumination device according to claim 1, wherein the flexible substrate includes:
   an elongating portion elongating along the light-guiding member; and
   a folded portion that is bent from an end of the elongating portion and is provided with the light source.

3. The line illumination device according to claim 2, wherein the elongating portion is disposed along a guide provided in an opening section.

4. The line illumination device according to claim 1, wherein the light-guiding member includes a plane portion formed by cutting a column along a lengthwise direction thereof.

5. The line illumination device according to claim 4, further comprising a reflection layer that is formed by printing white paint on the plane portion of the light-guiding member.

6. The line illumination device according to claim 5, wherein the reflection layer is formed so that a center of the reflection layer is wider than an end portion of the reflection layer at which the light source is disposed.

7. An image input apparatus comprising:
   the line illumination device according to claim 1;
   a lens that converges light from the line illumination device through an original; and
   a sensor that receives the light converged by the lens.

8. The image input apparatus according to claim 7, wherein the original is a currency note.

9. The line illumination device according to claim 1, wherein the light source includes first and second light sources disposed so that the first light source opposes the second light source with the light-guiding member therebetween.

10. A line illumination device comprising:
    a rod-shaped light-guiding member, the rod-shaped light-guiding member extending in a length direction a distance much greater than the rod-shaped light-guiding member extends in a thickness direction and a width direction;
    a light source that emits light to the light-guiding member;
    a frame that includes an opening section housing the light-guiding member therein; and
    a flexible substrate that includes a wiring connected to the light source and is provided with the light source,
    wherein the flexible substrate is bent so that the light source is disposed at an end of the light-guiding member and that the flexible substrate is housed in the opening section.

11. A line illumination device comprising:
    a rod-shaped light-guiding member, the rod-shaped light-guiding member extending in a length direction a distance much greater than the rod-shaped light-guiding member extends in a thickness direction and a width direction;
    first and second light sources;
    a frame that houses the light-guiding member;
    a flexible substrate that is provided with the first and second light sources and includes a wiring connected to the first and second light sources; and
    a connector that is attached to the frame and connected to the wiring,
    wherein the flexible substrate is bent so that the first and second light sources are disposed at ends of the light-guiding member, respectively, and that the flexible substrate is housed in the frame.

12. The line illumination device according to claim 11, wherein the flexible substrate includes:

an elongating portion elongating along the light-guiding member;

a plurality of folded portions that are provided at both ends of the elongating portion and at a center of the elongating portion, respectively, wherein the first and second light sources are provided on the folded portions at both ends of the elongating portion, respectively, and wherein the connector is provided on the folded portion at the center of the elongating portion.

13. The line illumination device according to claim 11, wherein the first and second light sources are disposed so that the first light source opposes the second light source with the light-guiding member therebetween.

14. A line illumination device comprising:

a rod-shaped light-guiding member including a plane portion in a lengthwise direction thereof, the rod-shaped light-guiding member extending in a length direction a distance much greater than the rod-shaped light-guiding member extends in a thickness direction and a width direction;

a reflection layer that is formed on the plane portion of the light-guiding member and that reflects incident light;

a light source that emits light to the light-guiding member;

a frame including an opening section to house the light-guiding member so that the plane portion faces a bottom of the opening section; and a flexible substrate that is provided with the light source and includes a wiring connected to the light source, wherein the flexible substrate is bent so that the light source is disposed at an end of the light-guiding member and that the flexible substrate is housed in the opening section.

15. A line illumination device comprising:

a frame including an opening section and a through hole;

a rod-shaped light-guiding member housed in the frame;

a flexible substrate;

a light source that is provided on the flexible substrate and emits light to the light-guiding member;

a transmission plate that covers an entrance of the opening section;

a connector that is connected to the flexible substrate and is exposed to outside of the frame through the through hole;

wherein the flexible substrate is bent so that the light source is disposed at an end of the light-guiding member and that the flexible substrate is housed in the opening section, wherein power is fed from the connector to the light source through the flexible substrate so that the light source emits light and the light-guiding member emits light in line-shape to the outside.

16. A line illumination device comprising:

a frame including an opening section and a through hole;

a rod-shaped light-guiding member housed in the frame;

a light source that is disposed at an end of the light-guiding member and emits light to the light-guiding member;

a wiring that is connected to the light source and is bent to be housed in the frame; and a connector that is connected to the wiring and is exposed to outside of the frame;

wherein power is fed from the connector to the light source through the wiring so that the light source emits light and the light-guiding member emits light in line-shape to the outside.

17. The line illumination device according to claim 16, further comprising a transmission plate that covers an entrance of the opening section.

* * * * *